United States Patent [19]

Falender et al.

[11] 4,431,771

[45] Feb. 14, 1984

[54] POLYMERIZATION OF SILICONE POLYMER-FILLER MIXTURES AS POWDERS

[75] Inventors: James R. Falender, Sanford; John C. Saam, Midland, both of Mich.

[73] Assignee: Dow Corning Corporation, Midland, Mich.

[21] Appl. No.: 474,920

[22] Filed: Mar. 14, 1983

[51] Int. Cl.$^3$ .............................................. C08L 83/04
[52] U.S. Cl. ................... 524/863; 524/493; 524/588; 524/847; 528/21; 528/23
[58] Field of Search ............... 524/493, 588, 847, 863; 528/21, 23

[56] References Cited

U.S. PATENT DOCUMENTS 2,803,617  8/1957  Corrin ................................... 260/37
4,101,499  7/1978  Herzig .................................. 524/863

FOREIGN PATENT DOCUMENTS 1325654  8/1973  United Kingdom .

*Primary Examiner*—Melvyn T. Marquis
*Attorney, Agent, or Firm*—Edward C. Elliott

[57] ABSTRACT

A method of producing a silicone polymer-filler mixture in powder form has been developed. The method combines an oligomer consisting of a polydiorganosiloxane, sufficient acidic or neutral reinforcing filler to yield a powder, and a catalytic amount of a catalyst consisting of (a) sulfuric acid or a sulfonic acid of the formula $XSO_3H$ wherein X is selected from the group consisting of halogen, alkyl, aryl, alkoxy and alkaryl radicals, (b) perfluorinated alkane sulfonic acid, and (c) a combination of quaternary ammonium carboxylate and carboxylic acid, to give a powdery mixture. The powdery mixture is polymerized, then the catalyst is inactivated while maintaining a powdery state. The method requires a minimum of energy for mixing.

22 Claims, No Drawings

POLYMERIZATION OF SILICONE POLYMER-FILLER MIXTURES AS POWDERS

BACKGROUND OF THE INVENTION

1. Field of the Invention

This invention relates to the polymerization of polydiorganosiloxanes in the presence of reinforcing filler while the ingredients are maintained as powders.

2. Description of the Prior Art

Silicone rubber has been manufactured by first polymerizing various diorganosiloxane oligomers to higher molecular weight, then reinforcing the resulting polymer by mixing in a filler such as colloidal silica. The dispersion of the reinforcing filler into the polymer requires a great deal of energy, particularly when the polymer has a high enough molecular weight to yield a gum.

Corrin, in U.S. Pat. No. 2,803,617, issued Aug. 20, 1957, claims a process of preparing filler-containing organopolysiloxanes in particulate form. His process is carried out by heating a mixture of a cyclic organosiloxane, a solid filler, and catalytic amounts of ferric halides. After heating, a free flowing powder results which can be milled, catalyzed, and molded in the same manner as conventionally produced silicone rubber compositions. The powdered rubber does not develop "structure" upon storage. Corrin teaches that when potassium hydroxide, a common polymerization catalyst, is used in his process in place of the ferric halide, a gum results rather than a powdered product.

Buchner et al., in British Pat. No. 1,325,654, issued Aug. 8, 1973, disclose a process for manufacture of a mixture of high molecular weight linear organopolysiloxane with an acidic or neutral filler. Their method mixes together, in a mixing and kneading device, a low molecular weight organocyclosiloxane, filler, and anhydrous perfluoroalkane sulfonic acid.

SUMMARY OF THE INVENTION

A method of producing an elastomeric silicone polymer-filler mixture in powdered form has been developed. A mixture is prepared of hydroxyl-endblocked polydiorganosiloxane oligomer, acidic or neutral reinforcing filler, and a catalyst selected from the group consisting of sulfuric acid, sulfonic acid, fluorinated alkane sulfonic acid, and a combination of quaternary ammonium carboxylate and anhydrous carboxylic acid, the mixture forming a powder. The powdery mixture is polymerized by heating and removing water while maintaining the mixture as a powder. After polymerization, the catalyst is inactivated. The product is in the form of a powder consisting of reinforcing filler and polydiorganosiloxane polymer in which the polymer has a higher molecular weight than that of the starting oligomer. The mixture can be catalyzed with the conventional silicone catalysts, then molded and vulcanized to yield elastomeric products. This method requires much less energy than the conventional process of milling or mixing reinforcing filler into a high viscosity fluid or gum.

The finely powdered mixture resulting from the method of this invention can be easily mixed with other finely divided fillers, pigments, and catalysts to give fully compounded products in the form of powders. Mixing such powders into a homogeneous product is much easier, using cheaper equipment and less energy, than the conventional method of compounding pastes in a dough mixer or on a 2 roll mill.

DESCRIPTION OF THE INVENTION

This invention relates to a method of producing a silicone polymer-filler mixture in powdered form comprising (A) combining (i) 100 parts by weight of a polydiorganosiloxane oligomer of the formula $HO(R_2SiO)_xH$ wherein each R is a radical selected from the group consisting of methyl, ethyl, propyl, phenyl, vinyl, allyl, and 3,3,3-trifluoropropyl, and x is from 3 to 100 inclusive; (ii) sufficient reinforcing filler, said filler being acidic or neutral, to yield a powder when (i) and (ii) are mixed together; and (iii) a catalytic amount of a catalyst selected from the group consisting of (a) sulfuric acid or a sulfonic acid of the formula $XSO_3H$, wherein X is selected from the group consisting of halogen, alkyl, aryl, alkoxy, and alkaryl radicals, (b) perfluorinated alkane sulfonic acid and (c) a combination of quaternary ammonium carboxylate and carboxylic acid, to yield a powdery mixture, (B) polymerizing the oligomer while maintaining the mixture in a powdery state, and (C) inactivating the catalyst to yield a storage stable silicone polymer-filler mixture in the powdery state in which (i) has increased in molecular weight.

The method of this invention produces a dispersion of reinforcing filler in linear polydiorganosiloxanes in the form of a powder. The method requires a minimum amount of energy because the ingredients are originally mixed as a low viscosity fluid and finely divided particulate solid; then the ingredients are converted to a reinforcing filler in a linear polydiorganosiloxane of a higher molecular weight while retaining the mixture throughout the process as a powder. As used in this invention, "polymerizing" refers to a reaction in which 2 or more of the same or different polydiorganosiloxane oligomer molecules of (i) are combined to form a polydiorganosiloxane having a higher molecular weight than the starting oligomer. Because the polymerization takes place while the mixture is a powder, very little energy is required to stir the material. Because the mixture is in the form of a finely divided powder, there is a large amount of surface area present per unit weight of mixture. During those polymerizations in which it is desired to remove water from the system, the large available surface area aids in the rapid removal of water. Passing a dry gas through the mixture or drawing a vacuum on the mixture removes water from the particle surface. Internal water then diffuses to the surface and is in turn removed. Because the particles are finely divided, on the order of from about 5 micrometers to about 10 nanometers, the distance that the water must diffuse through the particle to reach the surface is very short and little time is required.

The equipment used in this method can be the usual means of mixing and reacting powders such as a fluidized bed, a stirred powder reactor, or a tumbling reactor such as a ball mill. The equipment needs to be able to continuously pass dry gas through the powder to remove water during the polymerization step. The temperature of the equipment must be controllable so that the powder can be heated and cooled as required by the embodiment being used. Because the mixture remains a powder, it is not necessary that the equipment be sufficiently sturdy to withstand the stress of mixing a high viscosity mass as is customarily required when a polydiorganosiloxane gum and a reinforcing filler are mixed together in a dough mixer or on a two-roll rubber mill.

For purposes of illustrating the method of this invention, an embodiment using a catalyst such as dodecyl benzene sulfonic acid is described, using a fluidized bed reactor as the polymerization container.

A method of polymerizing polydiorganosiloxane-filler mixture using sulfuric acid or non-fluorinated sulfonic acid has been developed. The starting oligomer in this embodiment is a polydiorganosiloxane of the formula $HO(R_2SiO)_xH$ wherein each R is a radical selected from the group consisting of methyl, ethyl, propyl, phenyl, vinyl, allyl, and 3,3,3-trifluoropropyl, and x has an average value from 3 to 100. The filler is composed of finely divided particles of an acidic or neutral nature and is classed as reinforcement for silicone elastomers. Reinforcing fillers have particle sizes in the colloidal range and specific surface area of greater than 50 $m^2/g$, usually above 150 $m^2/g$. A preferred filler is fumed silica with a surface area of from 150 $m^2/g$ to 450 $m^2/g$.

A sulfonic acid of the formula $XSO_3H$ wherein X is selected from the group consisting of halogen, alkyl, aryl, alkoxy, and alkaryl radicals is used as a catalyst, a preferred sulfonic acid being a monoalkyl substituted benzene sulfonic acid of the formula $R^2C_6H_4SO_3H$, wherein $R^2$ is a monovalent hydrocarbon radical of at least 6 carbon atoms. A preferred sulfonic acid is dodecyl benzene sulfonic acid. A further description of the ingredients useful in this embodiment is found in the patent application of Saam and Falender, "Method of Polymerizing Polydiorganosiloxane, Fluid-Filler Mixture Using Sulfuric or Sulfonic Acids", Ser. No. 474,918 filed on the same date as the instant application, assigned to the same assignee as the instant application, which is hereby incorporated by reference to further describe the ingredients and requirements of this embodiment.

The oligomer, catalyst, and filler are mixed together so that a uniform mixture in the form of a powder results. A convenient method of mixing is placing the filler into a container which can be rotated to tumble the powder, then adding the oligomer and catalyst and tumbling until the oligomer and catalyst are uniformly distributed through the powder. A certain ratio of filler to oligomer is necessary in order for the mixture to remain in the form of a powder. Small amounts of filler, 2 parts of powder in 100 parts of oligomer for instance, would not yield a mixture in the form of a powder. Amounts of filler above about 35 parts of filler per 100 parts of oligomer can yield a powder, if the proper filler, oligomer and mixing conditions are selected, the exact amount depending upon the absorbency of the particular filler used for the oligomer used and the method of mixing. For example, a preferred method is that described above in which the powder is placed in the container which is then rotated to tumble the powder or the powder is placed into a container with a slow speed mixing type impeller to stir the powder without generating a large amount of shear. The oligomer is then slowly added to the moving filler so that it is uniformly distributed throughout the powder without wetting any portion of the powder to the point where it would form a clump of powder or a paste. If the oligomer is added to the container and then the filler added, the mixture forms a paste and then it is necessary to continue to add filler and stir until the paste changes into particles and then breaks down into a powder. The first procedure is preferred because it allows a greater range of oligomers and fillers to be handled as powders.

The maximum amount of filler that can be added is determined by the amount of filler desired in the silicone polymer-filler mixture rather than the amount necessary to maintain a powder. The effects of filler loading on the properties of silicone polymer-filler mixtures are well known to those skilled in the art. When the silicone polymer-filler mixture is used to produce an elastomer, too high a filler loading degrades the physical properties of the cured silicone rubber. The maximum practical amount of reinforcing filler is about 100 parts by weight based upon 100 parts by weight of polymer. The preferred amount of filler is determined by the properties desired in the final, cured silicone rubber, such as the hardness, for instance.

A fluidized bed reactor is used which has been equipped so that it can be heated and cooled to control the temperature of the contents. The fluidizing gas coming into the reactor to provide the fluidized bed passes through a means for controlling the temperature of the gas before it reaches the reactor. In the laboratory, a suitable means is a piece of stainless steel tubing, wrapped with a heating tape that is temperature controllable, placed in the tubing that leads the gas to the bottom of the reactor. A low speed stirrer in the bed is used to circulate the powder throughout the bed to aid in uniformity without causing enough shear to cause the powder to change into a paste. The flow of gas into the bed is controlled so as to cause fluidization of the powder without causing the powder to be carried out of the bed. Dry nitrogen is a preferred gas because it is a convenient source of a dry gas. The gas functions both to fluidize the powder and to remove the water of condensation formed as the oligomer is polymerized to a higher molecular weight. It is necessary to remove the water in order to obtain a high molecular weight polymer, a weight average molecular weight above 100,000, for instance.

In this embodiment of this invention, polymerization can take place at room temperature. All that is necessary is the mixing of the oligomer, filler and catalyst in the form of a powder, then maintaining the mixture in a powder form for a time sufficient to allow the oligomers to polymerize to a higher molecular weight. This simple method is limited in the molecular weight that can be reached because of water that is in the system. Hydroxyl radicals in the system act as endblocking units and limit the molecular weight that can be reached. In order to obtain higher molecular weights, it is necessary to limit the amount of water in the system during polymerization When higher molecular weights are desired, the fluidized bed is heated to a temperature above room temperature, 100° C. to 170° C. for example, and the gas fed into the reactor is heated to a comparable temperature. When the mixture of oligomers, filler, and catalyst in the form of a powder is placed in the hot reactor and a hot gas is used to form the fluidized bed, any water present in the mixture is removed and carried out of the system by the gas. After the mixture is dried, the temperature is reduced to a lower temperature, 30° C. to 35° C. for example, and polymerization is allowed to continue. The water formed during polymerization is continuously removed by the dry gas passing through the system. The removal of the water allows the polymerization to high molecular weights, 200,000 weight average molecular weight for example.

When the oligomer has been polymerized to the desired degree, the catalyst is inactivated, in this embodiment by mixing in a Lewis base. A sufficient amount of Lewis base is added to neutralize the catalyst. A large excess should not be used. Preferred Lewis bases include ammonia, concentrated ammonium hydroxide, amines such as diethylamine, basic metal oxides such as calcium oxide and magnesium oxide, silazanes such as hexamethyldisilazane, and alkoxides such as potassium tertiary butoxide and magnesium isopropoxide. A molar excess of inactivating material is used to ensure that the silicone polymer-filler mixture is stable upon storage. Liquid neutralizing agents can be sprayed into the fluidized bed while it is being stirred to ensure a uniform dispersion of the neutralizing agent and complete inactivation of the catalyst. Solid neutralizing agents such as basic metal oxides, such as magnesium oxide, should be in a finely divided form, an average particle size of less than 5 micrometers for instance, so that they can be added to the fluidized powder and thoroughly dispersed to inactivate the catalyst. If the liquid neutralizing agent is sufficiently volatile, it can be carried into the powder by entrainment in the stream of gas being used for fluidization. Preferred inactivating materials for this embodiment are diethylamine and finely divided magnesium oxide. A preferred amount of magnesium oxide is from 0.4 to 5.0 parts of magnesium oxide per 100 parts of oligomer.

Because the method of this invention maintains the mixture of polydiorganosiloxane, reinforcing filler, and catalyst as a powder throughout the process, there is no easy means of following the polymerization or estimating the molecular weight of the polymer. Preliminary experiments must be performed using the desired ingredients and embodiment of the method of this invention, varying the polymerization time, catalyst concentration, and polymerization temperature, to establish the required values to produce the desired end product.

The silicone polymer-filler mixture obtained following the method of this invention is in the form of a powder. It is manufactured using less energy than is conventionally used in producing such a mixture because it is in powdered form throughout the polymerization, as illustrated above. It requires much less energy to stir and blend the ingredients when they are in the form of fine powder than when they are in the form of a viscous mass, as is customarily the case. Because the material is fine powder, water can be readily removed by the gas flowing through the powder because of the large surface area between the powder and the gas.

A second embodiment of this invention uses a perfluorinated alkane sulfonic acid as the catalyst. The preferred perfluorinated alkane sulfonic acid is of the formula $C_nF_{2n+1}SiO_3H$ wherein n is from 1 to 30 inclusive. Most preferred are acids in which n is less than 20. Trifluoromethane sulfonic acid is a preferred catalyst. The perfluorinated alkane sulfonic acid is used in an amount of at least 400 parts by weight per one million parts by weight of oligomer. A concentration of from 400 parts to 4000 parts of catalyst per million parts of oligomer is preferred with from 500 to 1500 parts of catalyst preferable for producing high molecular weight polymers. As the amount of catalyst is increased, the polymerization rate increases, but the equilibrium molecular weight obtained goes down, so a compromise amount must be selected depending upon the desired final product.

When using trifluoromethane sulfonic acid catalyst, the polymerization step (B) comprises heating the mixture of step (A) to a temperature of from about 70° C. to 150° C. to induce rapid polymerization and remove water. Then the temperature is adjusted to from 20° C. to 100° C. while continuing to remove water. The temperature is maintained until the desired degree of polymerization is reached.

After the desired degree of polymerization is reached, the catalyst is inactivated by mixing with a Lewis base. After inactivation the temperature is allowed to proceed to ambient. The preferred inactivation agent is calcined magnesium oxide when high molecular weight polymer is desired, with 1 part of calcined magnesium oxide per 100 parts of oligomer preferred. After inactivation the powder is a storage stable silicone polymer-filler mixture. A further description of the ingredients and temperatures useful in this second embodiment may be found in the patent application of Falender and Saam, "Method of Polymerizing Oligomers of Polydiorganosiloxane in the Presence of Filler", Ser. No. 474,916 filed on the same date as the instant application, assigned to the same assignee as the instant application, which is hereby incorporated by reference to further describe the ingredients and requirements of this embodiment.

A third embodiment of the method of this invention uses a quaternary ammonium carboxylate and carboxylic acid as the catalyst. The catalyst is a mixture of from 0.05 to 5.0 parts by weight of quaternary ammonium carboxylate of the formula

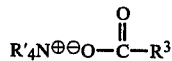

where each R' is selected from the group consisting of monovalent aliphatic radicals having from 1 to 20 carbon atoms and aralkyl radicals and each $R^3$ is selected from the group consisting of monovalent aliphatic hydrocarbon radicals of 5 or less carbon atoms, phenyl radical, or benzyl radical, at least one R' having 4 or greater carbon atoms, the quaternary ammonium carboxylate being soluble in (i) and from 0.05 to 50 parts by weight of carboxylic acid of the formula $R^3COOH$ where $R^3$ is as defined above.

In this embodiment, the polydiorganosiloxane, filler, and catalyst mixture of quaternary ammonium carboxylate and carboxylic acid are mixed together to form a powder, then placed into the hot reactor. The temperature of the reactor can be between 90° C. and 150° C. As the temperature is raised, the polymerization rate rises. If the temperature is raised too far, the catalyst is inactivated. The range of 100° C. to 135° C. is preferred, with the range of 110° C. to 130° C. most preferred. In this embodiment it is usually necessary to add additional carboxylic acid during the polymerization to keep the catalyst mixture active. Because the polymerization is carried out at temperatures of from 90° C. to 150° C., the carboxylic acid can be lost from the system and must be periodically replaced to keep the catalyst mixture active. A convenient method of adding the replacement carboxylic acid is by means of the fluidizing gas being used to provide the fluidized bed. The gas stream is directed through a container of carboxylic acid where the gas stream entrains some of the carboxylic acid and carries it into the fluidized bed reactor to replace that which is lost. This method of maintaining carboxylic acid in the mixture is workable because the amount of carboxylic acid present is not critical as long as sufficient is present to maintain activity of the catalyst mixture. The polymerization is continued by maintaining the elevated temperature and continuing the passage of the dry gas through the system to remove any water.

After the polydiorganosiloxane (i) has been polymerized to the desired degree, the catalyst is inactived by heating to a temperature sufficient to cause the polymerization to cease. This heating step is carried out to remove residual carboxylic acid, to decompose the catalyst, and to remove the byproducts of the catalyst decomposition. The temperature required is determined by the quaternary ammonium carboxylate and carboxylic acid used. When the quaternary ammonium carboxylate is lauryltrimethyl ammonium acetate and the carboxylic acid is acetic acid, the preferred inactivation temperature is from 150° C. to 200° C. After inactivation the mixture is cooled to room temperature to yield a storage stable silicone polymer-filler mixture in the powdery state.

Examples of quaternary ammonium carboxylates are tetra-n-butylammonium acetate, lauryltrimethylammonium acetate, dilauryldimethylammonium acetate, and lauryltrimethylammonium formate. The quaternary ammonium carboxylate is preferably used in conjunction with the corresponding carboxylic acid. A preferred amount of quaternary ammonium carboxylate is from 0.1 to 2.0 parts by weight. A preferred quaternary ammonium carboxylate is lauryltrimethylammonium acetate. The amount of carboxylic acid is not critical, as long as it is present during the polymerization. A preferred carboxylic acid is glacial acetic acid. A further description of the ingredients and temperature useful in this embodiment may be found in the patent application of Bowman, Falender, Lipowitz, and Saam, entitled "Method of Polymerizing Hydroxyl Endblocked Polydiorganosiloxane Using Quaternary Ammonium Carboxylate-Carboxylic Acid Catalyst", Ser. No. 474,917 filed on the same date as the instant application, assigned to the same assignee as the instant application, which is hereby incorporated by reference to further describe the ingredients and requirements of this embodiment.

The silicone polymer-filler powdery mixture obtained by following the method of this invention is useful in producing materials similiar to those produced from the conventional filled polydiorganosiloxane obtained by polymerizing a polydiorganosiloxane to the desired viscosity and then adding filler by mixing in a high strength mixer such as dough mixer or a two-roll mill. The method of this invention yields a silicone polymer-filler mixture in the form of a powder, with significantly lower net energy requirement, therefore a lower cost, than the conventional filled polydiorganosiloxane. The silicone polymer-filler mixture in powder form is storage stable, that is, it does not crepe-harden at a significant rate. The silicone polymer-filler mixture can be extensively sheared by milling to give a coherent paste which can be used in silicone mixtures used as electrical insulation compounds or as greases.

The storage stable silicone polymer-filler mixture can be combined with other ingredients such as extending fillers, additives, pigments, and catalysts to produce mixtures suitable for producing elastomers. The other ingredients, many of which are readily available as powders, can be mixed with the silicone polymer-filler mixture by simple powder blending methods such as tumblers. The energy required for such mixing is minimal when compared to mixing thick pastes and gums. If desired such powder mixtures could be stored and transported as powders using bins and air-transportation systems as are well known for transporting powders. After transportation to work stations, the powder could be processed into coherent shapes by such means as molding, milling, or extruding. Curing the coherent shapes in known manner would yield an elastomer.

The silicone polymer-filler mixtures produced by the method of this invention can be used in producing curable compositions which yield cured silicone elastomer. A common method is the addition of an organic peroxide vulcanizing agent to the filled polydiorganosiloxane mixture. The organic peroxide vulcanizing agents suitable for use in silicone elastomers are well known. Other well known methods of producing curable compositions from filled polydiorganosiloxanes are also suitable.

The following examples are included for illustrative purposes only and should not be construed as limiting the invention which is properly set forth in the appended claims.

EXAMPLE 1

A filter funnel with a frittered glass disc was converted into a fluid bed reactor by the addition of an electrical heating tape to the outside of the funnel to supply heat and a silicone rubber stopper across the top to form a sealed container. The rubber stopper contained openings for a thermometer, which was connected through a control system to the electric heater to allow control of the temperature inside the container, for a stirrer, and for an outlet for nitrogen gas which was used to fluidize the powder to be formed in the container. The nitrogen entered through the bottom of the funnel and passed through the frittered glass disc which acted as the bottom of the container. The nitrogen gas was piped through a rotometer to regulate the flow, then through a sealable container which could be used to saturate the gas with liquid in the sealable container.

A mixture was prepared by mixing in a container 24 g of a hydroxyl-endblocked polydimethylsiloxane having a degree of polymerization of about 35 (molecular weight of about 2600) and a viscosity of about 0.08 Pa·s at 25° C. with 0.24 g of catalyst ingredient consisting of 40 percent active lauryltrimethylammonium acetate for 5 minutes. Then 9.6 g of fumed silica having a surface area of about 130 m$^2$/g was added and the mixture was then tumbled for 45 minutes. This amount of silica is equivalent to 40 parts by weight of fumed silica for each 100 parts by weight of polydimethylsiloxane. The powdery mixture was then transferred to the funnel in the apparatus described above, the funnel having been heated to 120° C. Dry nitrogen gas was passed through the sealable container which contained glacial acetic acid, a catalyst ingredient, then through a section of stainless steel tubing wrapped with a heating tape which was used to heat the gas and then into the funnel at a rate sufficient to fluidize the powder. The stirrer was turned on for the first minute of operation then only intermittently during the reaction to assure that the powder was uniformly distributed in the funnel. The reaction was allowed to continue for 5 hours, then the glacial acetic acid was removed from the nitrogen gas line and the reactants were heated to 200° C. to destroy the catalyst, then cooled to room temperature to give a mixture of silica filler and silicone polymer in powder form.

To determine the molecular weight of the silicone polymer, the filler was separated from the powdered mixture by placing approximately 1 g of the silicone polymer-filler mixture in a mixture of 12 g of toluene and 12 g of ammonium hydroxide. This was shaken for 24 hours, at which time the polymer had dissolved in the toluene layer. After centrifuging to remove the filler from the solution, the toluene layer was decanted and the toluene allowed to evaporate. The residue was then subjected to gel permeation chromotography techniques which showed a weight average molecular weight of 397,000 and a number average molecular weight of 89,900 showing that the hydroxyl endblocked polydimethylsiloxane was polymerized in the presence of the fumed silica filler.

The powdered mixture of polymer and filler was catalyzed by mixing 100 parts by weight powder with 3 parts by weight of 50 percent active 2,4-dichlorobenzoyl peroxide on a two-roll rubber mill. The catalyzed sample was press molded for 5 minutes at 117° C. into a test sheet, then oven cured for 4 hours at 200° C. The sheet was cut into test pieces and tested in accordance with ASTM-D2440 for durometer, ASTM-D412 for tensile strength and elongation, and ASTM-D2632 for Bashore resiliency. The measured values were durometer, Shore A, 45; tensile strength, 5.9 MPa; elongation at break, 280 percent; and Bashore resilience of 50 showing the usefulness of the cured elastomeric product.

EXAMPLE 2

The above method was repeated using the amounts of fumed silica and polymerization times and temperatures shown in Table I.

The powdered mixture of polymer and filler produced in each case was catalyzed, molded, and tested as in Example 1; the results being as shown in Table I.

TABLE I

| Sample | 1 | 2 | 3 |
|---|---|---|---|
| Fumed silica, parts | 40 | 40 | 50 |
| Polymerization, hours | 2 | 2 | 2 |
| Polymerization, °C. | 120 | 140 | 120 |
| Molecular Weight | | | |
| weight average | 580,000 | 308,000 | 149,000 |
| number average | 109,000 | 61,300 | 18,000 |
| Durometer, Shore A | 34 | 42 | 40 |
| Tensile strength, MPa | 4.84 | 4.13 | 3.55 |
| Elongation, percent | 317 | 216 | 470 |

EXAMPLE 3

The equipment of Example 1 was used with a different catalyst and means of inactivating the catalyst to produce a stable silicone polymer-filler mixture in the powdery state.

A mixture was prepared by mixing 24 g of the polydimethylsiloxane of Example 1 and 0.24 g of dodecyl benzene sulfonic acid, then adding 9.6 g of the fumed silica of Example 1 and tumbling the powder for 15 minutes. The fluid bed reactor was preheated to 150° C., then the powder was added and stirred for 10 minutes with dry nitrogen flowing through to obtain a fluidized state. The heaters were then turned off and the temperature allowed to drop for 1 hour wherein it reached 30° C. The temperature was held at 30° C. for another hour. The catalyst was then neutralized by adding 1 g of magnesium oxide to 33 g of the powder. This mixture was then combined with 1 g of the organic peroxide catalyst of Example 1 and mixed on a two-roll rubber mill to give a massed material. The massed material was molded and tested as in Example 1; the results being as shown in Table II. A sample was evaluated for molecular weight as in Example 1 with the results shown below in Table II. The cured product is a useful elastomer.

TABLE II

| Molecular Weight | |
|---|---|
| weight average | 137,000 |
| number average | 48,000 |
| Durometer, Shore A | 45 |
| Tensile strength, MPa | 3.58 |
| Elongation, percent | 250 |
| Bashore resiliency | 43 |

That which is claimed is:
1. A method of producing a silicone polymer-filler mixture in powdered form comprising
 (A) combining
  (i) 100 parts by weight of a polydiorganosiloxane oligomer of the formula $HO(R_2SiO)_xH$ wherein each R is a radical selected from the group consisting of methyl, ethyl, propyl, phenyl, vinyl, allyl, and 3,3,3-trifluoropropyl and x is from 3 to 100 inclusive;
  (ii) sufficient reinforcing filler, said filler being acidic or neutral, to yield a powder when (i) and (ii) are mixed together ; and
  (iii) a catalytic amount of a catalyst selected from the group consisting of
   (a) sulfuric acid or a sulfonic acid of the formula $XSO_3H$, wherein X is selected from the group consisting of halogen, alkyl, aryl, alkoxy, and alkaryl radicals,
   (b) perfluorinated alkane sulfonic acid, and
   (c) a combination of quaternary ammonium carboxylate and carboxylic acid,
  to yield a powdery mixture,
 (B) polymerizing the oligomer while maintaining the mixture in a powdery state, and
 (C) inactivating the catalyst to yield a storage stable silicone polymer-filler mixture in the powdery state in which (i) has increased in molecular weight.
2. The method of claim 1 in which (B) is carried out in a fluidized bed reactor.
3. The method of claim 1 in which (B) is carried out in a stirred powder reactor.
4. The method of claim 1 in which (B) is carried out in a tumbling reactor.
5. The method of claim 2 in which the catalyst in (iii) is selected from a sulfonic acid of the formula $XSO_3H$, wherein X is selected from the group consisting of halogen, alkyl, aryl, alkoxy, and alkaryl radicals and in which step (C) comprises mixing the powder of (B) with a Lewis base.
6. The method of claim 5 in which the reinforcing filler in (ii) is colloidal silica present in an amount of from 35 to 100 parts by weight, the sulfonic acid in (iii) is a monoalkyl substituted benzene sulfonic acid of the formula $R^2C_6H_4SO_3H$, wherein $R^2$ is a monovalent hydrocarbon radical of at least 6 carbon atoms, and the Lewis base is selected from the group consisting of diethylamine and magnesium oxide.
7. The method of claim 6 in which step (B) comprises heating the mixture to a temperature of from 100° to 170° C. while removing water from the system, then cooling to a temperature of from 30° C. to 35° C. and holding at temperature for a period of greater than of 15 minutes until the desired increase in molecular weight is reached.

8. The method of claim 7 in which the Lewis base is magnesium oxide in an amount of from 0.4 to 5.0 parts by weight.

9. The method of claim 2 in which the catalyst in (iii) is a perfluorinated alkane sulfonic acid present in an amount of at least 400 parts by weight per million parts by weight of (i) and in which step (C) comprises mixing the powder of (B) with a Lewis base.

10. The method of claim 9 in which the reinforcing filler in (ii) is colloidal silica present in an amount of from 35 to 100 parts by weight, the perfluorinated alkane sulfonic acid in (iii) is of the formula $C_nF_{2n+1}SO_3H$ wherein n is from 1 to 30 inclusive, and the Lewis base is calcined magnesium oxide.

11. The method of claim 10 in which the perfluorinated alkane sulfonic acid is trifluoromethane sulfonic acid, and in which step (B) comprises heating the mixture of step (A) to a temperature of from about 70° C. to 150° C. to initiate polymerization and remove water, then adjusting the temperature to from 20° C. to 100° C. while removing water and maintaining at temperature until the desired degree of polymerization has been reached.

12. The method of claim 2 in which the catalyst in (iii) is a mixture of from 0.05 to 5.0 parts by weight of quaternary ammonium carboxylate of the formula

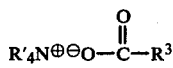

where each R' is selected from the group consisting of monovalent aliphatic radicals having from 1 to 20 carbon atoms and aralkyl radicals and each $R^3$ is selected from the group consisting of monovalent aliphatic hydrocarbon radicals of 5 or less carbon atoms, phenyl radical, and benzyl radical, at least one R' having 4 or greater carbon atoms, the quaternary ammonium carboxylate being soluble in (i) and from 0.05 to 50 parts by weight of carboxylic acid of the formula $$R^3COOH$$

where $R^3$ is selected from the group consisting of monovalent aliphatic hydrocarbon radicals of 5 or less carbon atoms, phenyl radical, and benzyl radical; step (B) comprises heating to a temperature of from 90° C. to 150° C. and removing water until the desired degree of condensation is reached; and step (C) comprises heating to a temperature sufficient to cause the polymerization to cease, removing volatile products, then cooling to room temperature.

13. The method of claim 12 in which the reinforcing filler in (ii) is colloidal silica present in an amount of from 35 to 100 parts by weight; the quaternary ammonium carboxylate is lauryltrimethyl ammonium acetate and the carboxylic acid is acetic acid; the temperature in step (B) is from 110° C. to 130° C., and the temperature of step (C) is from 150° C. to 200° C.

14. The polymer-filler mixture produced by the method of claim 1.

15. The polymer-filler mixture produced by the method of claim 6.

16. The polymer-filler mixture produced by the method of claim 11.

17. The polymer-filler mixture produced by the method of claim 13.

18. The method of claim 1 in which the silicone polymer-filler mixture is further mixed with curing agent to yield a curable composition.

19. The method of claim 6 in which the silicone polymer-filler mixture is further mixed with curing agent to yield a curable composition.

20. The method of claim 11 in which the silicone polymer-filler mixture is further mixed with curing agent to yield a curable composition.

21. The method of claim 13 in which the silicone polymer-filler mixture is further mixed with curing agent to yield a curable composition.

22. The elastomeric product obtained by curing the composition produced by the method of claim 18.

* * * * *